Sept. 21, 1937.  A. HAYASHI  2,093,520
STEREOSCOPE
Filed March 20, 1936
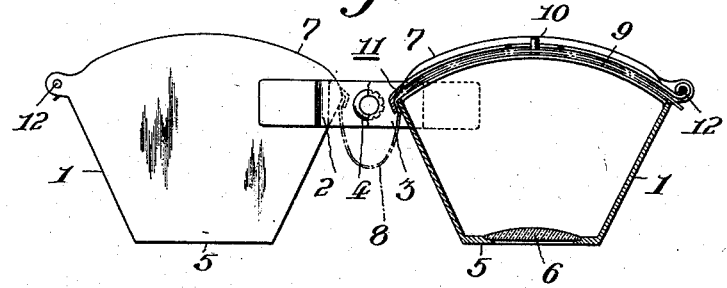
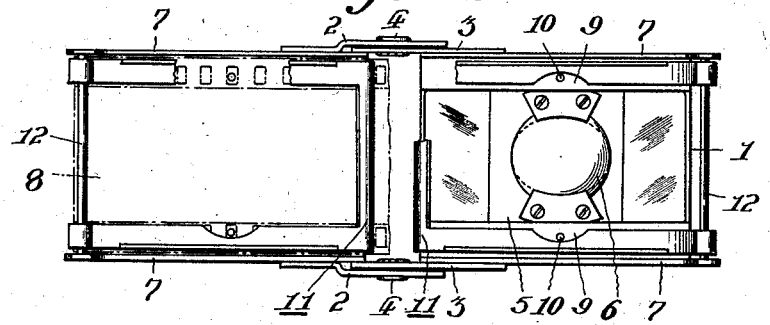
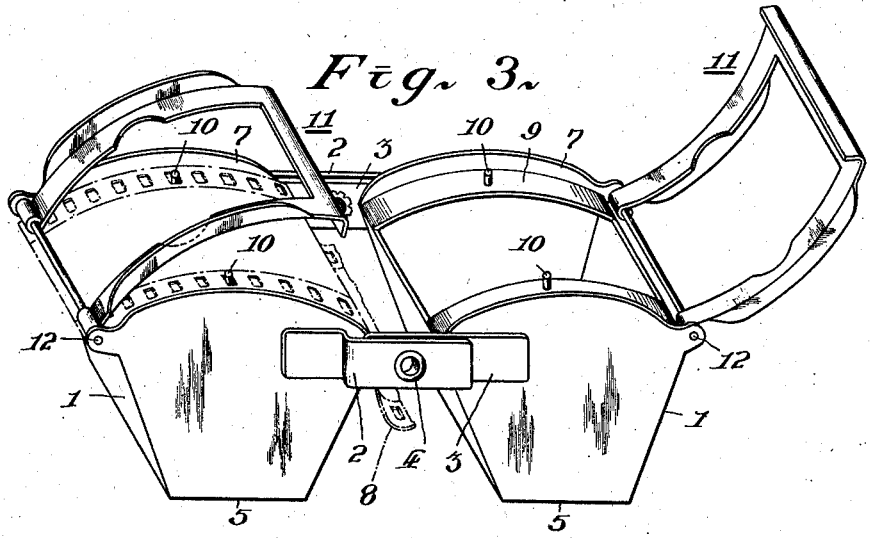

Patented Sept. 21, 1937

2,093,520

UNITED STATES PATENT OFFICE 2,093,520

STEREOSCOPE

Atsuhiro Hayashi, Tokyo-Shi, Japan

Application March 20, 1936, Serial No. 69,954

1 Claim. (Cl. 88—29)

This invention relates to an improvement in stereoscopes and has for its object to provide a wide angle-view stereoscope capable of clearly viewing a stereoscopic picture.

In the accompanying drawing:—

Fig. 1 is a side view, partly in section, illustrating an embodiment of the invention with a stereoscopic photographic print.

Fig. 2 is a top plan view of Fig. 1, parts being broken away for clearness.

Fig. 3 is a perspective view of Fig. 1, the holding members for stereoscopic picture being partly turned.

Referring to the drawing, I represents a carrier, and two such carriers are movably interconnected by suitable means to form a couple and to make the distance between the centers of viewing lenses in the carriers adjustable. In the drawing these are shown as connected by means of soldered arms 2 and 3 and eyelets 4. In the rear end 5 of each carrier is fitted a viewing lens 6, while the fore end 7 is adapted to hold a stereoscopic photographic print 8.

It is to be understood that the stereoscopic photographic prints for use in the stereoscope according to this invention must be those reproduced from the negative obtained by taking a stereoscopic photograph on a photographic sensitive film positioned along the curvature of image produced by the photographic objective of a stereoscopic photographic apparatus, the objective being made so as to form a curvature of image. The stereoscopic photographic apparatus are not shown and further described as they form no part of the present invention, and it will suffice to state that the photographic prints for use in my stereoscope must be such special photographic prints as above mentioned.

Near the fore end 7 of each carrier I are provided two transverse flanges 9 in opposite relation, which are curved in the curvature corresponding to the curvature of image produced by the photographic objective of the stereoscopic photographic apparatus used for obtaining the stereoscopic photographic pictures and adapted to support a stereoscopic photographic print 8 thereon. On each flange is provided a pin 10, for centering the said photographic print supported on the curved flanges. A holding member 11 is movably mounted on a pivot pin 12 in one end of the fore end of each carrier 1, and adapted to hold the said photographic print in position in co-operation with the flanges 9, the free end of the holding member being securely clipped over the fore end of a side wall of the carrier.

The viewing lens 6 is of the same optical property as the photographic objective used in the stereoscopic photographic apparatus for obtaining the photographic pictures used in my stereoscope, or an optical property near the same.

It will be understood that the stereoscopic photographic print is held on the fore end of the carriers of the stereoscope, keeping it in the same curvature as the curvature given to the negative when the photograph was taken, and that such arcuated photographic print will be observed through the lenses of the aforesaid optical property in the rear ends of the said carriers.

While I have described the invention above of one embodiment, it is to be understood that various changes may be made therein without departing from the spirit of the invention.

Having now particularly described and ascertained the nature of my said invention and in what manner the same is to be performed, I claim:—

A stereoscope for viewing stereoscopic prints that have curvature images, comprising a pair of carriers, means to adjustably connect the carriers together, said carriers each having a cylindrical curved film aperture plate, the curvature of said plates corresponding to the curvature of the images of the prints and said plates having their cylindrical axes substantially parallel, means centrally of the plates to register the images therewith, means to hold the films in the plates and stereoscopic lenses in said carrier for viewing the images.

ATSUHIRO HAYASHI.